Dec. 1, 1936.  H. L. SCHROEDER  2,062,531
BAKER'S PEEL
Filed April 29, 1933
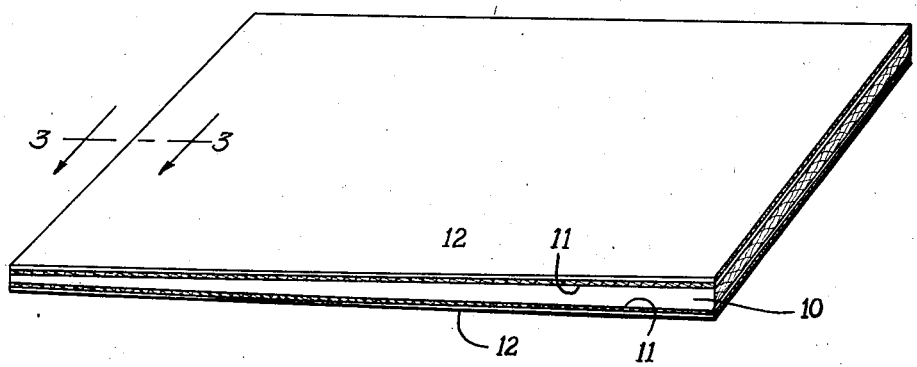
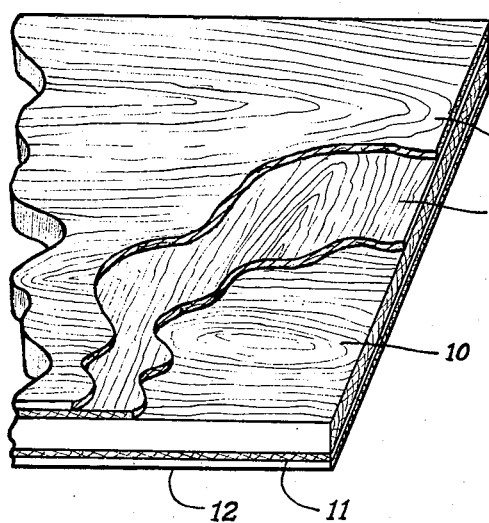
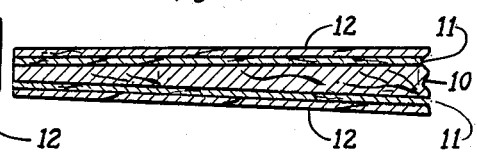
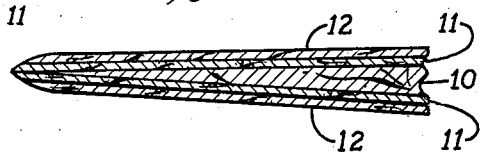
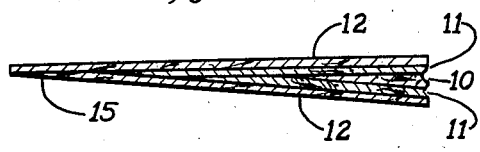
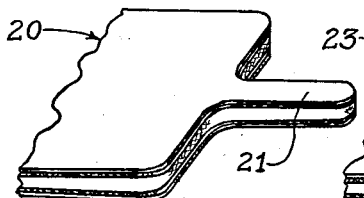
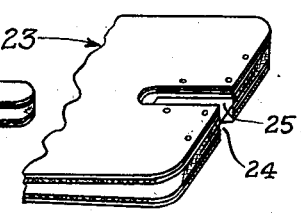
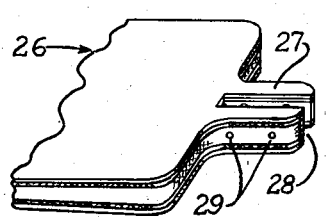
WITNESS:
INVENTOR.
Henry L. Schroeder.
BY
ATTORNEY.

Patented Dec. 1, 1936

2,062,531

UNITED STATES PATENT OFFICE 2,062,531

BAKER'S PEEL

Henry L. Schroeder, Chicago, Ill.

Application April 29, 1933, Serial No. 668,477

3 Claims. (Cl. 107—67)

The invention relates to baker's peels and more specifically to the construction of wood blades commonly used in baker's peels which are employed for holding loaves or quantities of dough or bread or other bakery goods. My improvement is particularly directed to a baker's peel blade of a composite structure that may be used as a part of a peel for loading and unloading ovens or for use in the raising or proofing of breads, the handling of crackers, buns, rolls, bread and all other bakery products which are handled by means of peels or baker's shovels. On account of the fact that ovens are subjected to intense heat and other supporting means for bread and other bakery goods is found to present rough and abrasive surfaces to the blades of peels or baker's shovels, the life of peel blades, which are ordinarily made of wood on account of lightness, is limited and it is a primary object of my invention to improve the construction of peel blades to render them more durable under conditions of use and also less liable to warping and deterioration under the conditions attendant upon the ordinary use of the same.

Other objects of the invention will appear from the following description of the invention, reference being had to the accompanying drawing forming a part of the specification, the novel features being set forth in particular in the appended claims.

In the said drawing:

Fig. 1 is a perspective view of a peel blade in what may be termed its blank form before being shaped for reception of the handle, the view illustrating the composite layers entering into the body of the blade.

Fig. 2 is a broken detail, fragmentary view illustrating the structure of the composite blade section or body of Fig. 1, the view particularly being illustrative of the manner in which the layers of wood are united to have the grain in the various layers extending substantially at right angles with respect to contiguous layers or laminae.

Fig. 3 is a fragmentary sectional view on line 3—3 of Fig. 1 looking in the direction indicated by the arrows.

Fig. 4 is a fragmentary, detail, sectional view of the composite blade blank of Fig. 1 indicating the manner in which the material at the thinner end of the blade is shaped to form a peel blade of a common type used as a bread take out peel, that is, for removing bread from an oven.

Fig. 5 is a sectional view similar to the views Figs. 3 and 4 but of a modified construction with respect to the thin end of the blade.

Figs. 6, 7 and 8 are fragmentary, perspective views of the finished handle end of different forms of peel blades made from the composite or laminated wood blank as shown in Fig. 1. The blank in Fig. 6 is shown as formed with a relatively short, integral handle thereon for use as a cracker peel. In Fig. 7 the blank is shown as slotted at the handle receiving end and provided with handle attaching means, while in Fig. 8 a fragmentary view of the handle attaching end of a blank embodying the invention is shown in which the blade is formed with an integral slotted projection at the handle receiving end by which a handle may be attached with bolts or other securing devices to the blade, the particular form of composite peel blade shown in Fig. 8 being adapted for removing and placing bread in ovens, while the form of the blade in Fig. 7 is particularly adapted for constituting the blade of a proofing peel.

In the making of peel blades, since the same must be subjected to oven heats in placing loaves of bread and other bakery goods in ovens and removing the same therefrom, wood is the preferred form of material used in making blades. The life of peel blades made of wood is very limited and especially where the blade is cut from wood that is liable to warp and crack on account of deformation due to the tendency of warping or cracking when the blade is subjected to heat of the oven and other variations in temperature.

The preferred manner of constructing my improved peel blade is to first form an intermediate wood section 10 which may be cut from an integral slab or plank of wood. The invention is particularly adapted to the construction of peel blades of the conventional form in which the blade, usually of general, rectangular shape, is tapered from the handle end to the forward end of the blade. The taper is obviously given to the forward end of the blade to enable the same to be inserted more readily beneath loaves of bread or other bakery goods either when in position upon a support or within an oven.

In the proofing peel blade blank of Figs. 1 to 3 inclusive, the intermediate body section 10, which may be of any desired thickness at the thicker end of the blank, is uniformly tapered toward the opposite extremity and will be cut so that the grain of the wood will run longitudinally of the blank as illustrated most clearly in Fig. 2. To reinforce the body 10 and prevent warping, I secure by means of glue or other suitable adhesive on the outer tapered flat faces of the section 10 sheets of wood 11, preferably in the form of a veneer with the grain extending transversely or at substantially right angles to the grain of the tapered body portion 10. In making up my composite blank body as shown in Figs. 1, 2 and 3, obviously the thickness and proportions of the integral parts will be varied in accordance with the resulting character of peel blade desired but for purposes of illustration, I may state that I have found that a peel blade of any desired width may be advantageously constructed of an intermediate section 10, ½ inch thick at its thicker extremity, or the handle end of the resulting blade, and having a uniform taper to bring the same down to $\frac{3}{32}$ of an inch at the thinner end when the thin forward end of the blade is desired to be constructed in accordance with the teachings as illustrated in Fig. 3. The thickness of the transverse veneer sections 11 on the opposite flat sides of the tapered body part 10 may be obviously varied as may be desired but with a blade having a body section 10 of approximately ½ inch thickness at the handle end, I find that the transverse veneer sections 11 may be conveniently formed of a wood veneer sheet approximately $\frac{1}{16}$ of an inch thick. Finally, to protect the transversely grained veneer sections 11, I glue over the outer surface of the sections 11, other veneer sections 12 of uniform thickness having the grain extending in the same direction as the grain of the tapered body part 10.

In the construction of my improved composite body blank for peel blade as shown in Figs. 1 to 3 inclusive, I have found it convenient to refer to the tapered body portion 10 as the core and the intermediate veneer sections 11 as the cross bands and the longitudinally grained outer veneer sections 12 as the faces of the blank body and these terms are so used herein.

From the above description of my improved composite blank, it may be seen that the core 10 is the foundation on which the additional layers 11 and 12 are placed and held in position by means of a suitable glue or adhesive, this core 10 governing the ultimate thickness and shape of the finished peel blade or blade body since the added reinforcing outer sections 11 and 12 are obviously of uniform thickness throughout.

While I have shown the core 10 as tapered and prefer this form of construction, I have found that the core 10 may, like the outer sections, be made of uniform thickness and certain results in peel blade construction secured by cutting or grinding down or otherwise thinning the end of the balde remote from the end to which the handle is secured, for example, in Fig. 3 the built up blade body is seen to be made comparatively thin but with the taper given to the body section 10 alone, while in the modified form shown in Figs. 4 and 5, the body section 10 is thinned down to a knife edge so that the transversely grained sections 11 contact at the thin end of the blank as illustrated in Fig. 5. One of the sections 11 beyond the terminus of the body section 10 may be tapered so that in the final application of the outer longitudinally grained veneer sections 12 as shown in Fig. 5, the latter may contact and be glued together to form a relatively thin forward edge in the manner illustrated at 15 in Fig. 5, and in constructing the peel blade from such a blank, the material may be left in that form or it may be ground or otherwise cut off in the manner illustrated in Fig. 4.

It is essential in constructing my improved peel blade blank body as shown in Figs. 1 to 3 inclusive that the cross bands 11 be first applied on both sides of the core 10 so that the grain of the wood of these respective contiguous parts will run opposite to each other. The outer veneer faces or sections 12 will then be applied and glued or fastened to the cross band sections 11 in such manner that the grain of the outer faces 12 will run opposite the grain of the cross bands 11 and hence parallel to the grain of the inner or tapered body section 10.

My improved built up peel blade, it will be seen, therefore, contains five distinct plys or layers of wood, each having the grain therein extending transversely to the grain in the adjacent ply or section and while I find that the most desirable peel blade is produced by the five-ply construction, I find in practice that the number of plys to be employed may be varied somewhat as to the resulting thickness of the finished product that may be desired and the thickness and character of peel blades will be found in practice to vary somewhat according to the use to which the same is to be put since in some instances they are used for putting loaves of bread dough in an oven for baking and in other cases they are used for removing loaves of bread from an oven or for proofing or for handling crackers and other bakery goods.

My improved type of construction of peel blade by reason of the fact that it has layers of wood running in opposite grain directions will eliminate or greatly reduce the possibility of the blades warping or splitting. The construction also makes it possible to utilize various grades of lumber in making up the respective layers of the composite blade body blank thereby effecting certain economies in the initial cost of construction.

My improved composite blank for peel blade bodies is adapted to be modified at the handle attaching end to form various types of baker's peels in the same manner as a peel blade formed from an integral body of wood or analogous material. For example, in Fig. 6 I show the composite blank of substantially the construction of Fig. 1 to form a peel blade designated generally by the reference character 20 with an integral handle portion 21, a construction which is frequently used with what is known in the art as cracker peels. In Fig. 7 I show the blank of Fig. 1 formed at the handle attaching end to produce a blade designated generally by the reference character 23 and having a slot 24 with a reinforcing metallic handle plate 25, the plate 25 being slotted in a manner not shown but well understood by those skilled in the art to enable a detachable handle to be attached thereto.

In Fig. 8 a peel blade formed from the composite blank of Fig. 1 is designated generally by the reference character 26 and an integral handle portion 27 is slotted at 28 and provided with transverse holes 29 adapted to receive bolts for securing a handle thereto in a manner well understood in this art.

The construction of peel blades illustrated in Figs. 6 to 8 inclusive clearly indicates the wide range of adaptability of my invention as embodied in my improved composite peel blade body construction as herein described and set forth. While I have referred to the construction of my improved composite peel blade body as comprising a core with four additional or veneered sections applied thereto, I do not desire to be limited to the same because I have found that in the construction of certain types of peel blades, interior tapered cores corresponding to the core 10 may be reinforced on one or both of the outer surfaces of the core by a greater number than two cross bands and face sections, hence I do not desire to be limited to the precise details of construction which may be modified by those skilled in the art, except as specifically set forth in the appended claims which define the scope of the invention.

I claim:

1. In a composite wooden baker's peel, an inner core with a tapered tip, veneered wooden sheets of uniform thickness attached to each other and to the tapered tip at each side, overlapping the core, and the inner veneered sheets contacting with each other beyond the tip and adhesively secured together.

2. A wooden peel in accordance with claim 1 in which the veneered sheets are tapered beyond the core tip to engage each other and produce a sharp outer edge and are adhesively secured together.

3. In a composite wooden baker's peel, an inner core with a tapered tip, veneered wooden sheets attached to each other and to the tapered tip at each side, overlapping the core, and the portions beyond the core tip being beveled and adhesively secured together, the grain of the veneer of corresponding sheets on opposite sides of the core being parallel to avoid warping when heated, the extremities of the meeting sheets forming a sharp projecting edge.

HENRY L. SCHROEDER.